May 24, 1960
J. N. DUPREE
2,938,200
ANNUNCIATOR PANEL
Filed Sept. 16, 1957
3 Sheets-Sheet 1
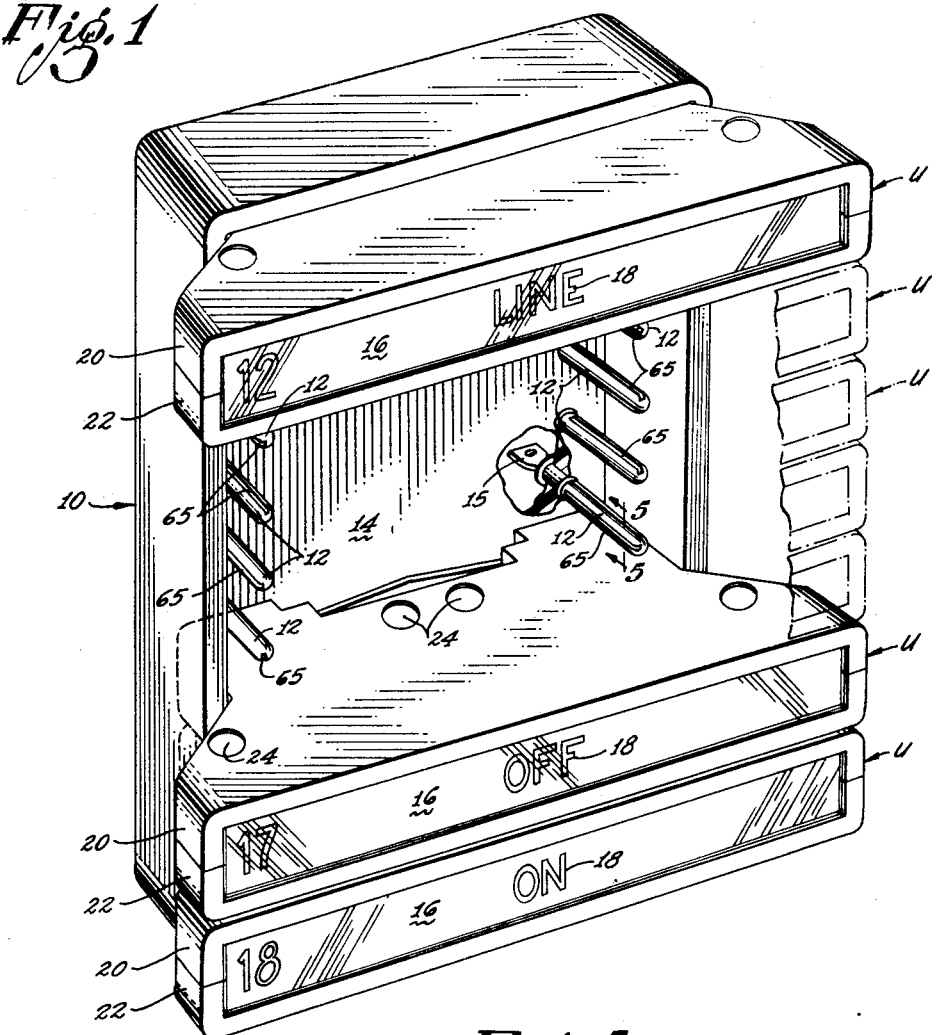
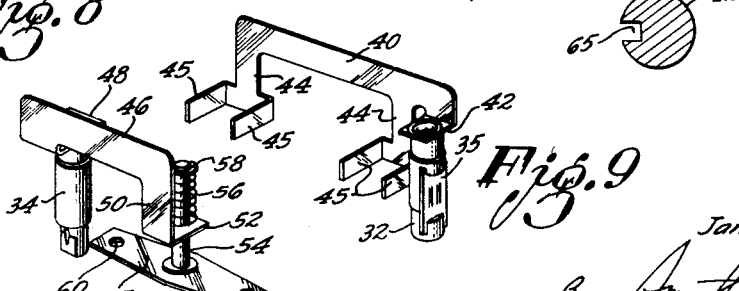
INVENTOR:
James N. Dupree
Attorneys May 24, 1960   J. N. DUPREE   2,938,200
ANNUNCIATOR PANEL
Filed Sept. 16, 1957   3 Sheets-Sheet 2
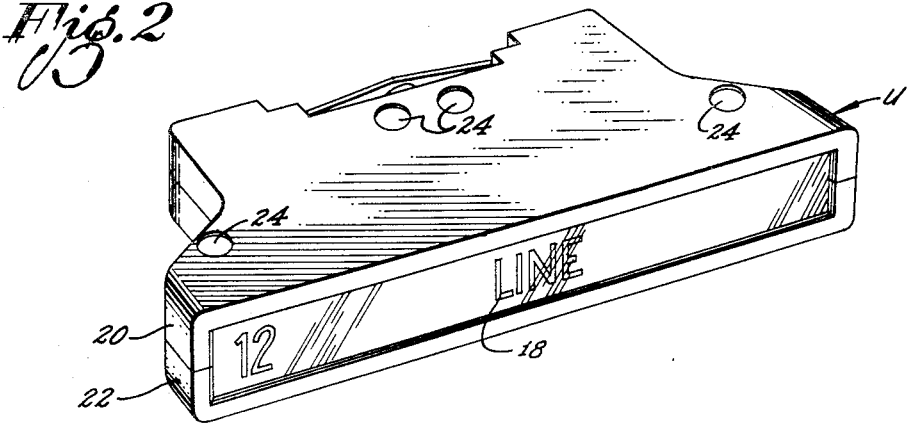
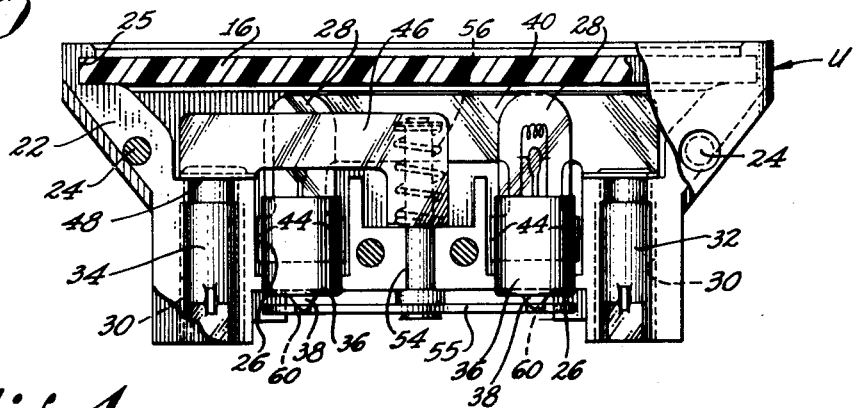
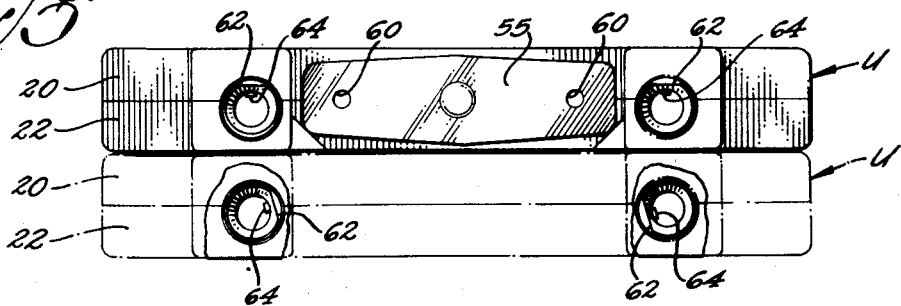
INVENTOR:
James N. Dupree
Attorneys May 24, 1960     J. N. DUPREE     2,938,200
ANNUNCIATOR PANEL
Filed Sept. 16, 1957     3 Sheets-Sheet 3
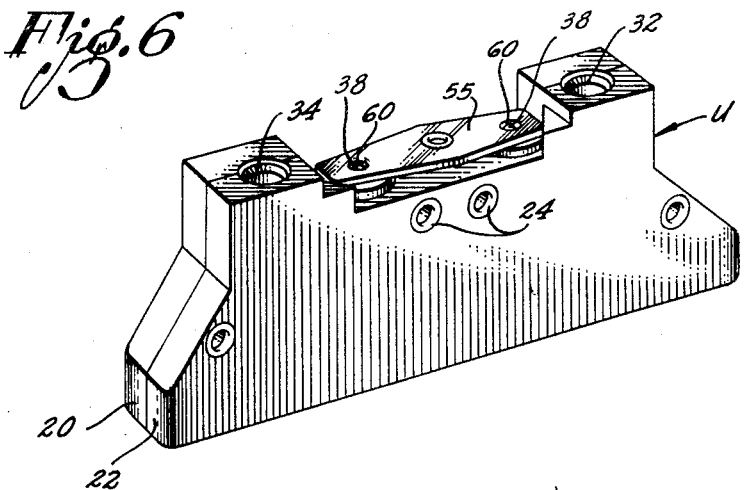
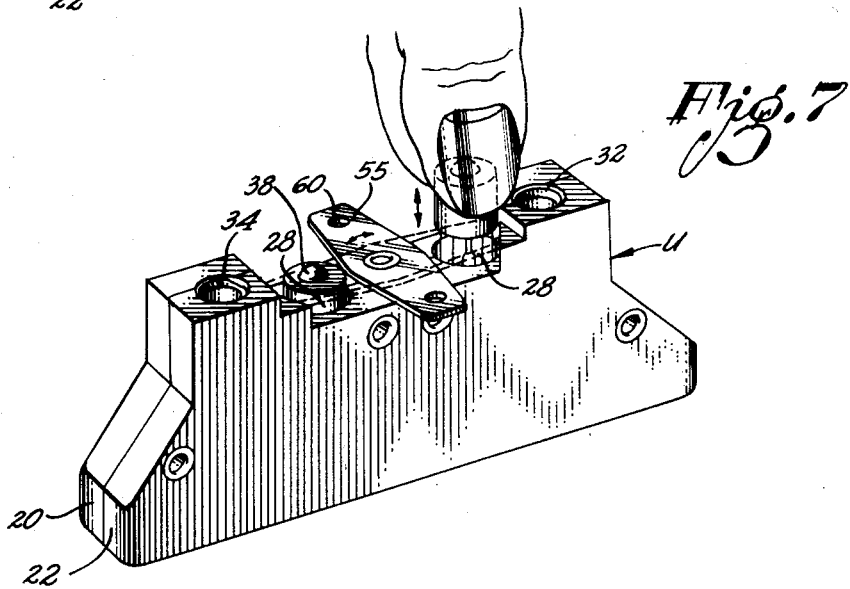
INVENTOR
James N. Dupree
Attorneys,

United States Patent Office 2,938,200
Patented May 24, 1960

2,938,200

ANNUNCIATOR PANEL

James N. Dupree, West Covina, Calif., assignor to California Plasteck, Inc., Los Angeles, Calif., a corporation Filed Sept. 16, 1957, Ser. No. 684,148

9 Claims. (Cl. 340—381)

This invention relates to indicating and warning devices and more particularly relates to devises of this general type having multiple panels with lettering or other indicia thereon for illumination selectively by remote control.

The invention has been initially embodied in a multiple indicating device known as an annunicator for use on an aircraft instrument panel to indicate the condition or operating state of various components in the aircraft system. This initial embodiment is described herein by way of example and will provide adequate guidance for those skilled in the art who may have occasion to apply the same principles to other specific purposes.

In this initial embodiment of the invention, and open front receptacle adapted for mounting on an instrument panel or the like is provided with contact means for connection to appropriate electric circuits and a plurality of indicator units is mounted in a bank across the front of the receptacle. Each indicator unit is a hollow structure having a front wall of light-transmitting material with indicia thereon and the indicia is illuminated by lamp means inside the unit. Each unit has a first contact and a second contact, this set of two contacts being adapted to cooperate with the contact means of the receptacle for energization of the lamp means.

One feature of the invention is the concept of constructing the indicator units to plug into the receptacle in a convenient maner. With such a construction it is a simple matter to withdraw an indicator unit from the receptacle whenever desired. A unit may be withdrawn, for example, for inspection of the contacts of the unit or for inspection of the contact means of the receptacle. A unit may be withdrawn also for replacement of the complete unit or replacement of the lamp means of the unit.

To make the indicator units removable in this manner, either the receptacle is provided with contact means in the form of prongs and the contacts of the units are socket members to receive the prongs or, conversely, the contacts of the units are prongs and the contact means of the receptacle comprises socket members. In the preferred practice of the invention, the prongs are carried by the receptacle.

One feature of the invention is the concept of using the cooperating prongs and socket members as index means whereby each indicator unit may be mounted on only one predetermined set of the prongs. Such an arrangement makes it possible to install an indicator unit in any position in the receptacle other than the correct position.

The indexing is accomplished by providing the cooperating prongs and socket members with lateral projections and longitudinal grooves to receive the projections, the angular positions of the projections and grooves varying among the sets of prongs and socket members so that the socket members of any one indicator unit fit only onto one set of the prongs. A further feature of the preferred practice of the invention is that the angular variation of the positions of the projections and grooves among the sets is $$\frac{360°}{N}$$

N being an odd number. In such an arrangement, it is impossible to install a unit inadvertently upside down on a wrong set of prongs because no two angular positions of the indexing projections can be 180° apart.

Each of the indicator units is provided with two lamps in two corresponding bores or sockets that extend into the unit from its rear or inner side. If one lamp fails, the other lamp illuminates the indicia of the unit but the illumination is noticeably uneven so that the failure of the one lamp is readily apparent. In this regard, a further feature of the invention is the concept of using a contact member of the unit for the dual purpose of holding the lamps in the sockets and of completing the circuits for energizing the lamps.

In the present embodiment of the invention, the dual purpose contact member is a metal plate mounted on a pivot between the two sockets to swing laterally from a normal closed lamp-retaining position and an alternate open position that fully exposes the sockets. The contact member is spring pressed towards the end contacts of the two lamps and preferably has recesses to receive the end contacts. Thus the recesses cooperate with the end contacts of the lamps to serve as detent means for yieldingly retaining the pivoted contact member in its normal closed position.

The various features and advantages of the invention will be apparent from the following detailed description considered with the accompanying drawings.

In the drawings, which are to be regarded as merely illustrative:

Figure 1 is a perspective view of a receptacle with some of the indicator units plugged into the receptacle;

Figure 2 is a perspective view of one of the indicator units that is employed in the presently preferred practice of the invention;

Figure 3 is a view of the unit largely in longitudinal section and partly in side elevation;

Figure 4 is an elevational view of the inner ends of two of the indicator units showing how the indicator units are indexed;

Figure 5 is an enlarged cross section taken as indicated by the line 5—5 of Figure 4, showing how a prong may be provided with a longitudinal groove for indexing purposes;

Figure 6 is a perspective view of an indicator unit as seen from the side and rear showing the pivoted contact member in its normal position for retaining lamps in the two lamp sockets of the unit.

Figure 7 is a similar view showing the contact member turned to its open position to permit replacement of the lamps;

Figure 8 is a perspective view of one of the two contact structures of an indicator unit; and Figure 9 is a perspective view of the other of the two contact structures of an indicator unit.

Figure 1 which illustrates the presently preferred embodiment of the invention shows how a plurality of indicator units, each generally designated by the letter U, may be removably mounted in an outlet box or receptacle 10 that is suitably adapted for mounting on the instrument panel of an aircraft. The indicator units U are plug-in units and for this purpose may be provided either with female contacts to cooperate with prong contacts of the receptacle 10 or may be provided with prong contacts to cooperate with female contacts of the receptacle.

In this particular practice of the invention, the prong contacts are carried by the receptacle 10 for cooperation with corresponding female contacts of the indicator units. Thus Figure 1 shows a plurality of prong contacts 12 mounted in the back wall 14 of the receptacle 10. The receptacle 10 is made of a suitable non-conducting plastic material and the prong contacts are imbedded in the plastic material. Each of the prong contacts 12 may be integral with a terminal 15 that extends rearward from the receptacle for connection to the required wiring. It will be noted in Figure 1 that there are two rows of the prong contacts 12 to provide a set of two prong contacts for each of the indicator units.

Each of the indicator units U is a hollow structure having a forward wall in the form of a plate 16 of light-transmitting material with suitable indicia 18 thereon for illumination by suitable lamp means inside the indicator unit. The light-transmitting material is preferably translucent.

In the present practice of the invention, each of the indicator units U comprises a hollow molded body of plastic material, each body comprising two molded sections 20 and 22 which mate with each other and are interconnected by rivets 24. The two molded sections 20 and 22 together provide a continuous internal groove 25 to secure the indicia plate 16 and also provide a pair of spaced cylindrical sockets 26 to receive a pair of lamps 28 for illuminating the indicia. In addition the two molded sections 20 and 22 together provide a pair of bores 30 extending into the indicator unit from the rear to house, respectively, a first female contact 32 and a second female contact 34 for cooperation with a corresponding pair of the prong contacts 12 of the receptacle 10. Each of the two female contacts 32 and 34 is in the form of a sleeve to slip over the corresponding prong contact 12 and, as best shown at 35 in Figure 9, each of the sleeve contacts may have a leaf spring insert for frictionally gripping the corresponding prong contact.

Each of the two lamps 28 may be of a conventional construction with a ferrule 36 to serve as one contact of the lamp and with a second contact 38 at the base end of the lamp. The two female contacts 32 and 34 of the unit are electrically connected with the two lamp contacts, respectively, the female contact 32 being in electrical communication with the lamp ferrules 36 and the second female contact 34 being in electrical communication with the end contacts 38 of the lamps.

The female contact 32 is part of a contact assembly which is best shown in Figure 9 and which includes a metal strip 40 having a flange 42 attached to the inner end of the female contact. The metal strip 40 has a pair of downwardly extending arm portions 44 corresponding to the two lamps 38 and each of these arm portions is formed with a pair of resilient fingers 45 which extend into the corresponding lamp socket 26 to grip the ferrule contact 36 of the corresponding lamp 28.

The second female contact 34 of each indicator U is part of a second contact assembly that is best shown in Figure 8. This second contact assembly includes a metal strip 46 having a flange 48 secured to the inner end of the female contact 34. The metal strip 46 has an arm portion 50 positioned intermediate the two lamp sockets 26 and this arm portion has a flange or tongue 52 that is apertured to slidingly retain the stem 54 of a contact member 55. A suitable coiled spring 56 embracing the stem 54 in compression between the tongue 52 and a radial flange 58 at the end of the stem continuously urges the contact member 55 towards the tongue 52.

The contact member 55 may be in the form of a metal plate of the configuration shown. The two ends of the contact member 55 extend across the respective sockets 26 at the normal position of the contact member to serve the dual purpose of holding the two lamps 28 in the sockets and of making electrical connection with the end contacts 38 of the two lamps. The effect of the coil spring 56 is to hold the two lamps 28 against vibration.

Preferably the contact member 55 is recessed to seat the two end contacts 38 of the lamp and for this purpose, the contact member may be provided with small apertures 60. By virtue of the coiled spring 56, the apertures 60 yieldingly engage the end contact 38 of the two lamps to provide a detent action to hold the contact member 55 in its normal closed position.

Since the plug-in indicator units U may be readily removed and replaced, it is of utmost importance that the units always be replaced at their correct positions. The invention provides an indexing arrangement by means of which each of the indicator units U is keyed to fit only one set of the prong contacts 12 so that it is impossible to install an indicator unit at any station other than its correct station in the receptacle 10. For this purpose, the various female contacts 32 and 34 of the indicator unit U are provided with inner laterally extending projections and the prong contacts 12 of the receptacle are provided with corresponding longitudinal grooves to receive the projections, the angular positions of the projections and grooves differing among the set of contacts.

In the preferred practice of the invention, the angular differences are one fifth of a circle or increments of 72° so that no indexing groove is positioned at 180° from any other indexing groove. This angular division avoids any possibility of an indicator unit being positioned upside down to fit some set of prong contacts at an incorrect station for the indicator unit.

In the present practice of the invention, each of the female contacts 32 and 34 is cut away as indicated at 62 to provide a small region in which the wall of the contact is relatively thin and the metal of the thin wall is off-set inward to form an inward projection 64. Each of the prong contacts 12 is provided with a longitudinal groove 65 to receive the corresponding projection 64.

The manner in which the invention serves its purpose may be readily understood from the foregoing description. It is apparent that the indicator units U may be readily installed and just as readily removed. It is a simple matter to pull out all of the indicator units for inspection of the prong contacts 12 of the receptacle as well as for inspection of the indicator units themselves. If one of the two lamps 28 in an indicator fails, the resulting uneven lighting of the corresponding indicia plate 16 is quickly noticed. To replace the defective lamp, it is merely necessary to pull the indicator unit out of the receptacle and then swing the contact member 55 to its open position, as shown in Figure 7, to permit the lamp to be replaced.

My description in specific detail of the presently preferred practice of the invention will suggest various changes substitutions and other departures from my disclosure within the spirit and scope of the appended claims.

I claim:

1. In a multiple indicator of the character described, the combination of: an open front receptacle for mounting on an instrument panel or the like; a plurality of hollow indicator units, each of said indicator units having forward light-transmitting walls with indicia thereon; lamp means in each of said indicator units to illuminate said indicia; a first plurality of contacts comprising a set of contacts on the rear side of each of said units, said contacts including female contacts; and a second plurality of forwardly extending contacts inside said receptacle for cooperation with said first plurality of contacts to complete circuits for energizing said lamp means, said second plurality of contacts including male contacts to cooperate with said female contacts with friction fits for wholly supporting said units whereby the units may be removably plugged into said receptacle to be held securely therein solely by the mutual engagement of said two pluralities of contacts.

2. In a multple indicator of the character described, the combination of: an open front receptacle for mounting on an instrument panel or the like; a plurality of hollow indicator units each having a forward light-transmitting wall with indicia thereon and each having interior lamp means for illumination of the indicia; a first plurality of contacts comprising a set of contacts on the rear side of each of said units; and a second plurality of contacts comprising corresponding sets of contacts inside said receptacle for cooperation with said first plurality of contacts to complete circuits for energizing said lamp means, one of said pluralities of contacts comprising prong members and the other of said pluralities of contacts comprising socket members to receive the prong members with friction fits for wholly supporting said units in the receptacle with the units arranged in a bank across the front of the receptacle, whereby the units may be removably plugged into said receptacle to be held securely therein solely by the mutual engagement of said two pluralities of contacts, the contacts of one of said pluralities having lateral projections and the contacts of the other of said pluralities having longitudinal grooves to receive said projections, the angular positions of said projections and grooves varying among the cooperating sets of contacts to permit only one set of prongs to mate with each set of socket members.

3. A combination as set forth in claim 2 in which the angular variation of said prongs and grooves among the various cooperating prongs and grooves is $$\frac{360°}{N}$$

N being an odd number.

4. A combination as set forth in claim 2 in which said prongs have longitudinal grooves and said socket members have inner projections for positioning in said grooves.

5. A combination as set forth in claim 2 in which said socket members are provided with resilient means for yielding contact with said prongs to prevent relative movement between said units and the receptacle in response to vibration of the receptacle.

6. An indicator unit of the character described for mounting in an open front receptacle for energization by contact means therein, comprising: a hollow structure having a forward light-transmitting wall with indicia thereon and having a pair of spaced forwardly extending lamp sockets opened at their rear ends to the rear exterior of the hollow structure; a pair of lamps in said sockets, each having a ferrule contact and a rear end contact; a first contact on said hollow structure for cooperation with said contact means of said receptacle; means extending from said first contact to each of said sockets for electrically connecting the first contact with the ferrule contacts of said lamps; a second contact on said hollow structure for cooperation with said contact means of said receptacle; and a contact member on said hollow structure normally positioned across the rear open ends of said sockets to close the sockets, to retain said lamps therein and to cooperate with the end contacts of the lamps, said contact member being electrically connected with said second contact to complete circuits for energizing the lamps, said contact member being pivoted on said hollow structure to swing laterally for covering and uncovering said sockets to uncover said sockets for access thereto.

7. A combination as set forth in claim 6 in which said contact member is movable axially along its pivot axis; and which includes spring means to urge said contact member axially into pressure engagement with the end contacts of the lamps.

8. A combination as set forth in claim 6 in which said contact member has recesses for seating said end contacts and is spring-loaded for pressure against the end contacts whereby the end contacts yieldingly retain said contact member in its normal position across said sockets.

9. A combination as set forth in claim 6 in which said contact member is a metal plate pivoted for edgewise swinging movement and said metal plate has apertures therein to seat said end contacts.

References Cited in the file of this patent

UNITED STATES PATENTS

| 1,829,648 | Haering | Oct. 27, 1931 |
| 2,005,863 | Koch | June 25, 1935 |
| 2,346,831 | Drury | Apr. 18, 1944 |
| 2,433,917 | McCartney | Jan. 6, 1948 |
| 2,703,398 | Harrington et al. | Mar. 1, 1955 |
| 2,764,751 | Gnadke | Sept. 25, 1956 |
| 2,769,974 | Hayes | Nov. 6, 1956 |
| 2,797,407 | Greenlee et al. | June 25, 1957 |

FOREIGN PATENTS

| 533,681 | Great Britain | Feb. 18, 1941 |